(12) United States Patent
Baumgart et al.

(10) Patent No.: US 6,466,408 B2
(45) Date of Patent: Oct. 15, 2002

(54) STORAGE SYSTEM SLIDER HAVING TRAILING EDGE PAD AND METHOD FOR MAKING THE SAME

(75) Inventors: Peter M. Baumgart, San Jose; Cherngye Hwang, San Jose; Andrei G. Khurshudov, San Jose; Son Van Nguyen, Los Gatos, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/526,952

(22) Filed: Mar. 16, 2000

(65) Prior Publication Data

US 2002/0089788 A1 Jul. 11, 2002

(51) Int. Cl.[7] .................................................. G11B 5/60
(52) U.S. Cl. ...................................................... 360/235.7
(58) Field of Search ....................................... 360/235.7

(56) References Cited

U.S. PATENT DOCUMENTS

| | | | |
|---|---|---|---|
| 5,159,508 A | * 10/1992 | Grill et al. ............... | 360/235.2 |
| 5,296,982 A | * 3/1994 | Terada et al. ............ | 360/126 |
| 5,473,486 A | * 12/1995 | Nepela et al. ............ | 360/126 |
| 5,661,618 A | 8/1997 | Brown et al. | |
| 5,734,519 A | 3/1998 | Fontana, Jr. et al. | |
| 5,781,377 A | 7/1998 | Koka et al. | |

FOREIGN PATENT DOCUMENTS

JP          63-42018          2/1988

\* cited by examiner

*Primary Examiner*—David Davis
(74) *Attorney, Agent, or Firm*—Altera Law Group, LLC (57) ABSTRACT

A storage system slider having a trailing edge pad and method for making the same is disclosed. A trailing edge pad to provide a carbon-carbon contact between the storage medium surface and slider and by reducing the thickness of the DLC so that the magnetic spacing is reduced. A slider body is formed having a first side, a second side, a leading edge and a trailing edge, an air bearing surface is formed on the slider body and a trailing edge pad is formed at the trailing edge of the slider. The air bearing surface may also include a protective overcoat with decreased thickness over the air bearing surfaces. The decrease in thickness of the protective overcoat may correspond to an increase in a magnetic spacing caused by the addition of the trailing edge pad to the slider, or may be greater than the corresponding increase in a magnetic spacing caused by the addition of the trailing edge pad to the slider. Moreover, the forming of the protective coat may be omitted. In this case, the trailing edge pad provides the only carbon-carbon interface between the slider and the disk.

16 Claims, 8 Drawing Sheets

STORAGE SYSTEM SLIDER HAVING TRAILING EDGE PAD AND METHOD FOR MAKING THE SAME

BACKGROUND OF THE INVENTION

1. Field of the Invention

This invention relates in general to a data storage system, and more particularly to a storage system slider having a trailing edge pad and method for making the same.

2. Description of Related Art

Conventional magnetic storage devices include a magnetic transducer or "head" suspended in close proximity to a recording medium, e.g., a magnetic disk having a plurality of concentric tracks. The transducer is supported by an air bearing slider mounted to a flexible suspension. The suspension, in turn, is attached to a positioning actuator. During normal operation, relative motion is provided between the head and the recording medium as the actuator dynamically positions the head over a desired track. The relative movement provides an air flow along the surface of the slider facing the medium, creating a lifting force. The lifting force us counterbalanced by a predetermined suspension load so that the slider is supported on a cushion of air. Air flow enters the leading edge of the slider and exits from the trailing end. The head resides toward the trailing end, which tends to fly closer to the recording surface than the leading edge.

The recording medium holds information encoded in the form of magnetic transitions. The information capacity, or areal density, of the medium is determined by the transducer's ability to sense and write distinguishable transitions. An important factor affecting areal density is the distance between the transducer and the recording surface, referred to as the fly height. It is desirable to fly the transducer very close to the medium to enhance transition detection. Some fly height stability is achieved with proper suspension loading and by shaping the air bearing slider surface (ABS) for desirable aerodynamic characteristics.

Another important factor affecting fly height is the slider's resistance to changing conditions. An air bearing slider is subjected to a variety of changing external conditions during normal operation. Changing conditions affecting fly height include, for example, change in the relative air speed and direction, and variations in temperature. If the transducer fly height does not stay constant during changing conditions, data transfer between the transducer and the recording medium may be adversely affected. Fly height is further affected by physical characteristics of the slider such as the shape of the ABS. Careful rail shaping, for example, will provide some resistance to changes in air flow.

Hard drive manufactures are starting to incorporate proximity recording type sliders in drives in order to achieve higher storage densities. The proximity recording slider is designed to maintain a small area near the read-write element in constant contact with the disk, and thus enabling smaller bit size and ultimately larger storage densities. This approach to increasing storage density puts considerable amount of strain on controlling wear at the slider-disk interface, because a slight variation in contact load and contact area could greatly affect the drive survivability.

Slider-disk contact results in lubricant depletion and degradation, wear of both surfaces, generation of wear particles, stick-slip, etc. All these phenomena affect magnetic performance of the disk drive, e.g., through jitter, as well as its durability. Nevertheless, as mentioned above, a contact slider is key for high-density magnetic recording.

Both, slider design and choice of material can minimize the negative effects of slider-disk contacts. For example, small contact pads on the slider minimize the contact area between slider and disk and decrease adhesion forces at the interface. Coating the ABS surface with a thin film of diamond-like carbon (DLC) decreases friction, increases wear resistance of both, slider and disk, reduces vibrations, etc.

Current products use carbon coatings of ca. 40 Å on the ABS (including a silicon sub-layer of about 10 Å to protect the MR element from corrosion. These 40 angstroms constitute 30% to 100% of the physical slider-disk separation for nominal slider designs with flying heights below 100 Å. In the future, it will be important to further decrease this spacing. However, the DLC layer is also needed to guarantee tribological characteristics of the slider. Slider DLC has proven to be a good tribological match for the disk carbon overcoat (COC). Therefor a thinner DLC layer will increase interfacial wear, friction, generation of wear particles, lube degradation, etc.

It can be seen that there is a need for a slider design with reduced DLC thickness while providing sufficient carbon-carbon contact at the disk-slider interface.

It can also be seen that there is a need for a storage system slider having a trailing edge pad and method for making the same.

SUMMARY OF THE INVENTION

To overcome the limitations in the prior art described above, and to overcome other limitations that will become apparent upon reading and understanding the present specification, the present invention discloses a storage system slider having a trailing edge pad and method for making the same.

The present invention solves the above-described problems by providing a trailing edge pad to provide a carbon-carbon contact between the storage medium surface and slider and by reducing the thickness of the DLC so that the magnetic spacing is reduced.

A method in accordance with the principles of the present invention includes forming a slider body having a first side, a second side, a leading edge and a trailing edge, forming air bearing surface on the slider body and forming a trailing edge pad at the trailing edge of the slider, wherein the trailing edge pad has a thickness that is greater than 10 $\mu$m to increase wear resistance of the trailing edge.

Other embodiments of a method in accordance with the principles of the invention may include alternative or optional additional aspects. One such aspect of the present invention is that the forming the air bearing surface further comprises forming a protective overcoat with decreased thickness over the air bearing surfaces.

Another aspect of the present invention is that the decrease in thickness of the protective overcoat corresponds to an increase in a magnetic spacing caused by the addition of the trailing edge pad to the slider.

Another aspect of the present invention is that the decrease in thickness of the protective overcoat is greater than the corresponding increase in a magnetic spacing caused by the addition of the trailing edge pad to the slider.

Another aspect of the present invention is that a protective overcoat is omitted.

Another aspect of the present invention is that the trailing edge pad provides the only carbon-carbon interface between the slider and the disk.

Another aspect of the present invention is that the trailing edge pad is formed only over a portion of the trailing edge, the trailing edge pad being positioned in alignment with a magnetic stripe of a magnetic head.

In another embodiment of the present invention, a slider having a carbon-carbon contact at a point where the slider interfaces with a disk includes a slider body having a first side, a second side, a leading edge and a trailing edge, an air bearing surface formed on the slider body and a trailing edge pad coupled to the slider at the trailing edge of the slider, wherein the trailing edge pad has a thickness that is greater than 10 $\mu$m to increase wear resistance of the trailing edge.

In another embodiment of the present invention, a system for storing and retrieving information, includes a magnetic disk, a motor, coupled to the disk, for rotating the disk, a recording surface, disposed on the magnetic disk, the recording surface dragging air as the disk rotates and creating an air flow in parallel with a tangential velocity of the disk rotation and a slider having a carbon-carbon contact at a point where the slider interfaces with a disk, the slider further includes a slider body having a first side, a second side, a leading edge and a trailing edge, an air bearing surface formed on the slider body and a trailing edge pad coupled to the slider at the trailing edge of the slider, wherein the trailing edge pad has a thickness that is greater than 10 $\mu$m to increase wear resistance of the trailing edge.

In another embodiment of the present invention, a disk drive apparatus for recording data includes at least one rotating disk for recording data, a housing, the rotatable disk being rotatably attached to the housing, an actuator arm assembly, coupled to the housing, a slider, attached to the actuator arm assembly proximate to the recording surface such that the slider can be selectively positioned over the surface of the rotating disk, the slider having a carbon-carbon contact at a point where the slider interfaces with a disk, the slider further including a slider body having a first side, a second side, a leading edge and a trailing edge, an air bearing surface formed on the slider body and a trailing edge pad coupled to the slider at the trailing edge of the slider, wherein the trailing edge pad has a thickness that is greater than 10 $\mu$m to increase wear resistance of the trailing edge.

In another embodiment of the present invention, a slider is declassed having a carbon-carbon contact at a point where the slider interfaces with a disk, wherein the slider includes a slider body having a first side, a second side, a leading edge and a trailing edge, an air bearing surface formed on the slider body, an alumina layer encapsulating a magnetic head, a protective overcoat formed over air bearing surface and at least one trailing edge pad coupled to the slider at the trailing edge of the slider, wherein the thickness of the trailing edge pad is selected to compensate for a corresponding selected decrease in thickness of the protective overcoat and wherein the decrease in thickness of the protective overcoat corresponds to an increase in a magnetic spacing caused by the addition of the trailing edge pad to the slider.

Another aspect of the present invention is that the at least one trailing edge pad comprises a plurality of layers sandwiched into the alumina layer.

Another aspect of the present invention is that the at least one trailing edge pad comprises a plurality of pads disposed along the trailing edge sandwiched into the alumina layer and aligned with the magnetic head.

Another aspect of the present invention is that the at least one trailing edge pad protrudes from the alumina layer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a storage system slider having a trailing edge pad and method for making the same. A trailing edge pad provides a carbon-carbon contact between the storage medium surface and slider and allows a reduction in the thickness of the DLC so that the magnetic spacing is reduced.

Figure 1:
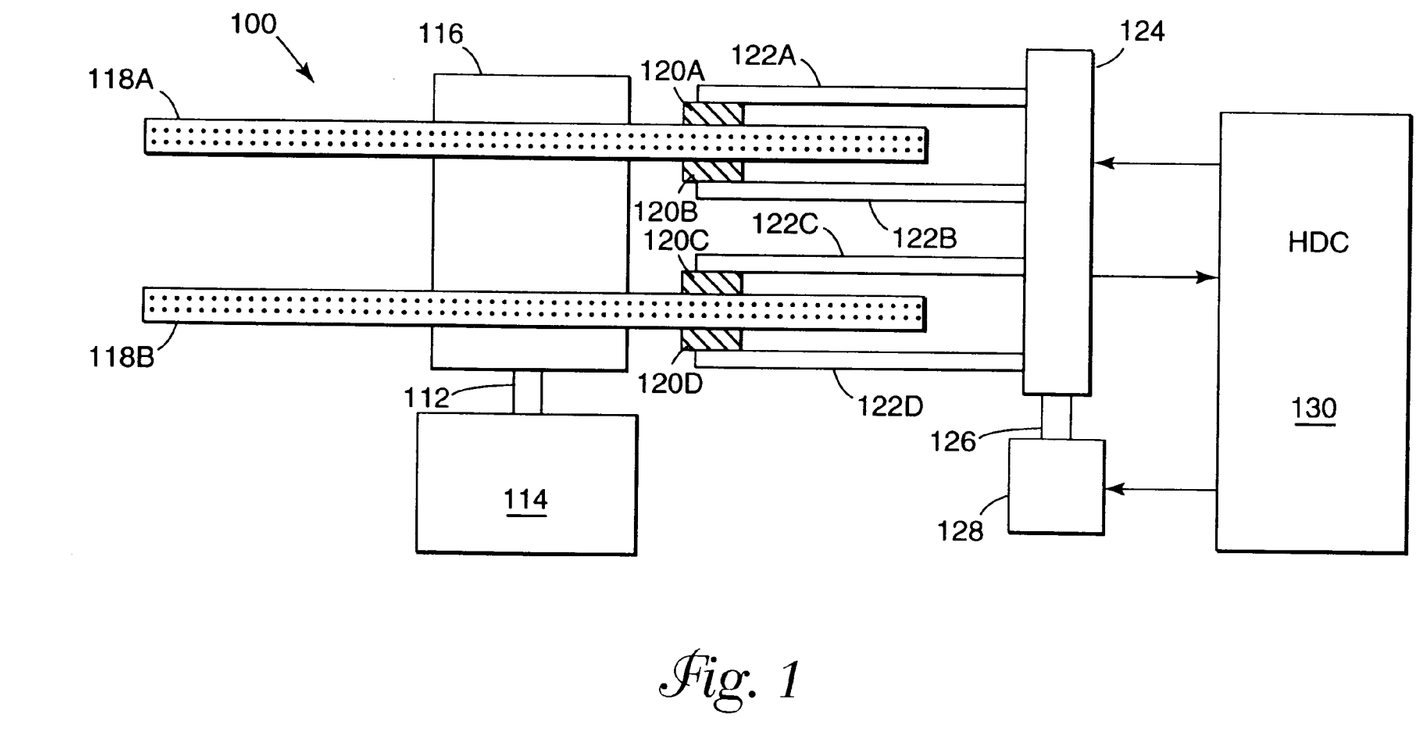
FIG. 1 illustrates a hard disk drive (HDD) including disks according to the present invention.

FIG. 1 illustrates a hard disk drive (HDD) 100 including disks 118A, 118B according to the present invention. The HDD 100 includes a disk 118 and a hard disk controller (hereinafter referred to as HDC) 130. The disk part has a motor 114 for rotating a shaft 112 at a high speed. A cylindrical support 116 is attached to the shaft 112 so that the their axes are in coincidence. One or more information recording disks 118A and 118B are mounted between support 116. Magnetic heads 120A, 120B, 120C and 120D are respectively provided to face the disk surface, and these magnetic heads are supported from an actuator 124 by access arms 122A, 122B, 122C, and 122D, respectively. The individual magnetic heads 120A to 120D receive the drive force transmitted from an actuator drive device 128 by a shaft 126 and rotates about the shaft 126 as the axis of rotation, and fly over the disk 118 to a predetermined position.

Figure 2:
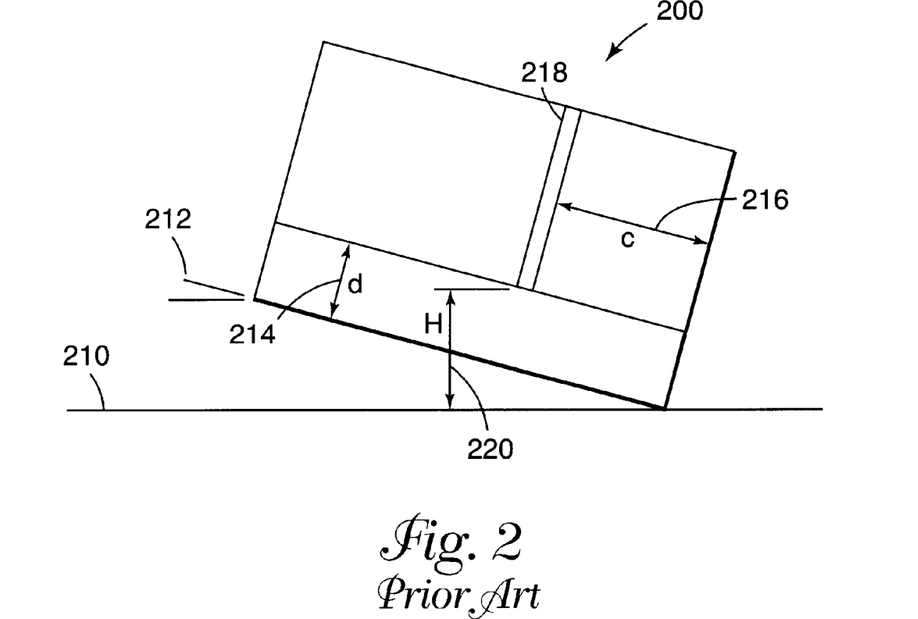
FIG. 2 illustrates a conventional slider design.

FIG. 2 illustrates a conventional slider design 200. In FIG. 2, the slider 200 is shown positioned over the disk 210. The slider is angled at pitch angle 212. The slider 200 includes a carbon-overcoat (COC)/silicon underlayer or Diamond-Like Carbon (DLC) layer 214 at a depth of d. In FIG. 2, the carbon-on-carbon coating is about 30 Å and the silicon undercoating is about 10 Å, i.e., d=40 Å. A layer 216 is deposited over the magnetic stripe 218. Assuming the thickness of the layer 216, C, is 20 μm and the pitch angle is in the range of 50 to 100 urads, the MR stripe-disk surface separation 220 is about 5.0–6.0 nanometers (nm) when the slider 200 touches the disk 210 at the trailing edge (contact mode), excluding crown effects, which will be discussed later.

Figure 3:
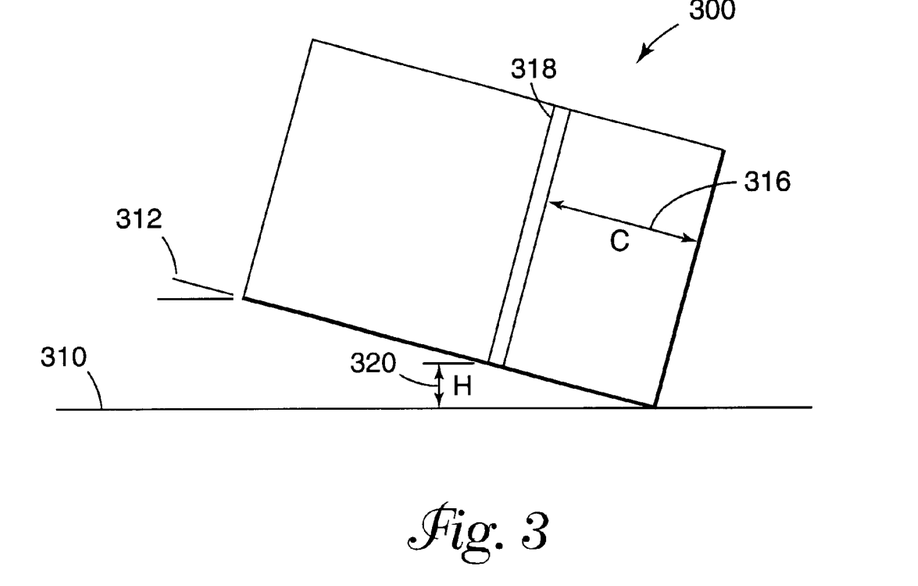
FIG. 3 illustrates a slider with the DLC layer removed.

FIG. 3 illustrates a slider 300 with the DLC layer removed. In FIG. 3, the slider 300 is again shown positioned over the disk 310. The slider is angled at the same pitch angle 312. Layer 216 remains at the trailing edge over the magnetic stripe 218. With the DLC layer removed completely, the MR stripe-disk surface separation 320 is equal to 1 nm to 2 nm. In this case, the contact occurs between alumina layer 316 and the carbon overcoat of the disk 310.

Figure 4:
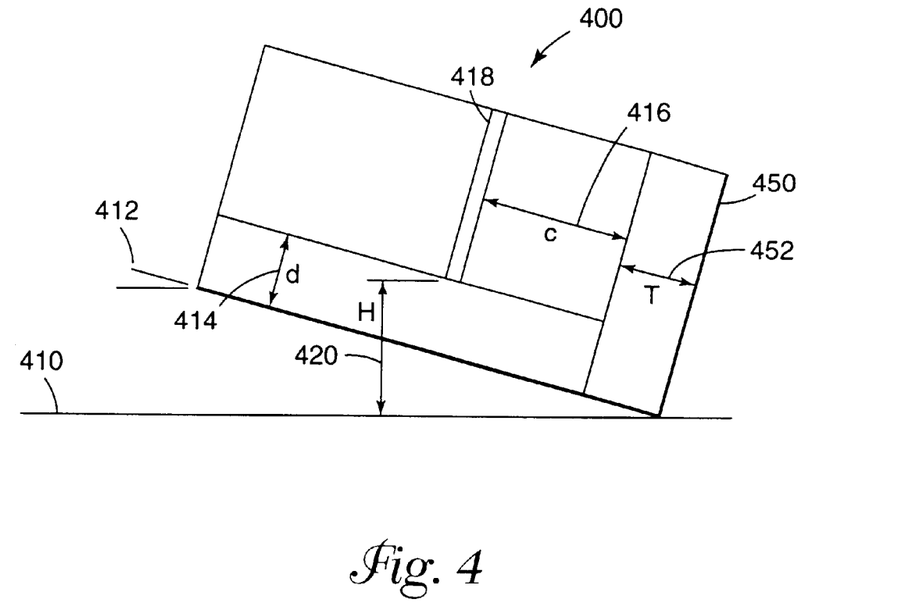
FIG. 4 illustrates a modification of a conventional slider.

FIG. 4 illustrates a modification of a conventional slider 400 according to the present invention. The slider 400 illustrated in FIG. 4 is the same as the slider 200 of FIG. 2, except that a Trailing Edge Pad (TEP) 450 has been added at the trailing edge. The slider 400 glides over the disk 410. The slider is angled at the same pitch angle 412. Layer 416 remains at the trailing edge over the magnetic stripe 418. A TEP 450 is added at the trailing edge to improve the tribology of the slider by providing carbon-to-carbon type of contact even after significant wear on the slider's trailing edge. The TEP 450 allows the carbon-overcoat (COC)/silicon underlayer or Diamond-Like Carbon (DLC) layer 414 to have a decreased thickness while providing the same magnetic spacing 420. For example, if layer 414 is not decreased in thickness, at pitch angles as specified above, a TEP thickness 452 of 10 μm translates to only 0.1–1.0 nm of increase in magnetic spacing 420. Thus, the TEP 450 allows layer 414 to be decreased in thickness and a TEP thickness 452 of at least 10 μm provides sufficient wear resistance at the trailing edge of the slider 400.

Figure 5:
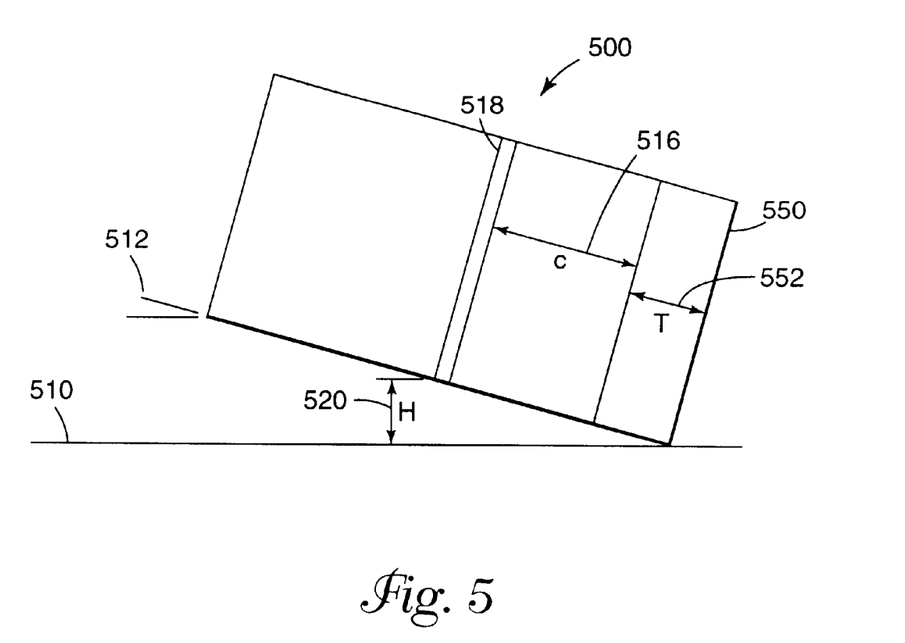
FIG. 5 illustrates one embodiment of a slider according to the present invention.

FIG. 5 illustrates one embodiment of a slider 500 according to the present invention. In FIG. 5, the slider 500 glides over the disk 510. The slider is angled at the same pitch angle 512. Layer 516 remains at the trailing edge over the magnetic stripe 518. The DLC layer has been removed completely. In order to keep a carbon-to-carbon contact at the head-disk interface (HDI), and at the same time eliminate the carbon from the ABS, a TEP 550 having a thickness 552 is added at the trailing edge over layer 516. As stated above, the TEP thickness is selected to provide sufficient wear resistance at the trailing edge of the slider 500. Other tribologically attractive materials, such as silicon carbide (SiC) or other high durability versions of carbon, e.g., 'cathodic arc' carbon or diamond coating, could also be considered for the pad material. The TEP slider 500 allows the functions of the carbon on the ABS (MR stripe protection) to be separated from carbon's role in HDI tribology.

Figure 6:
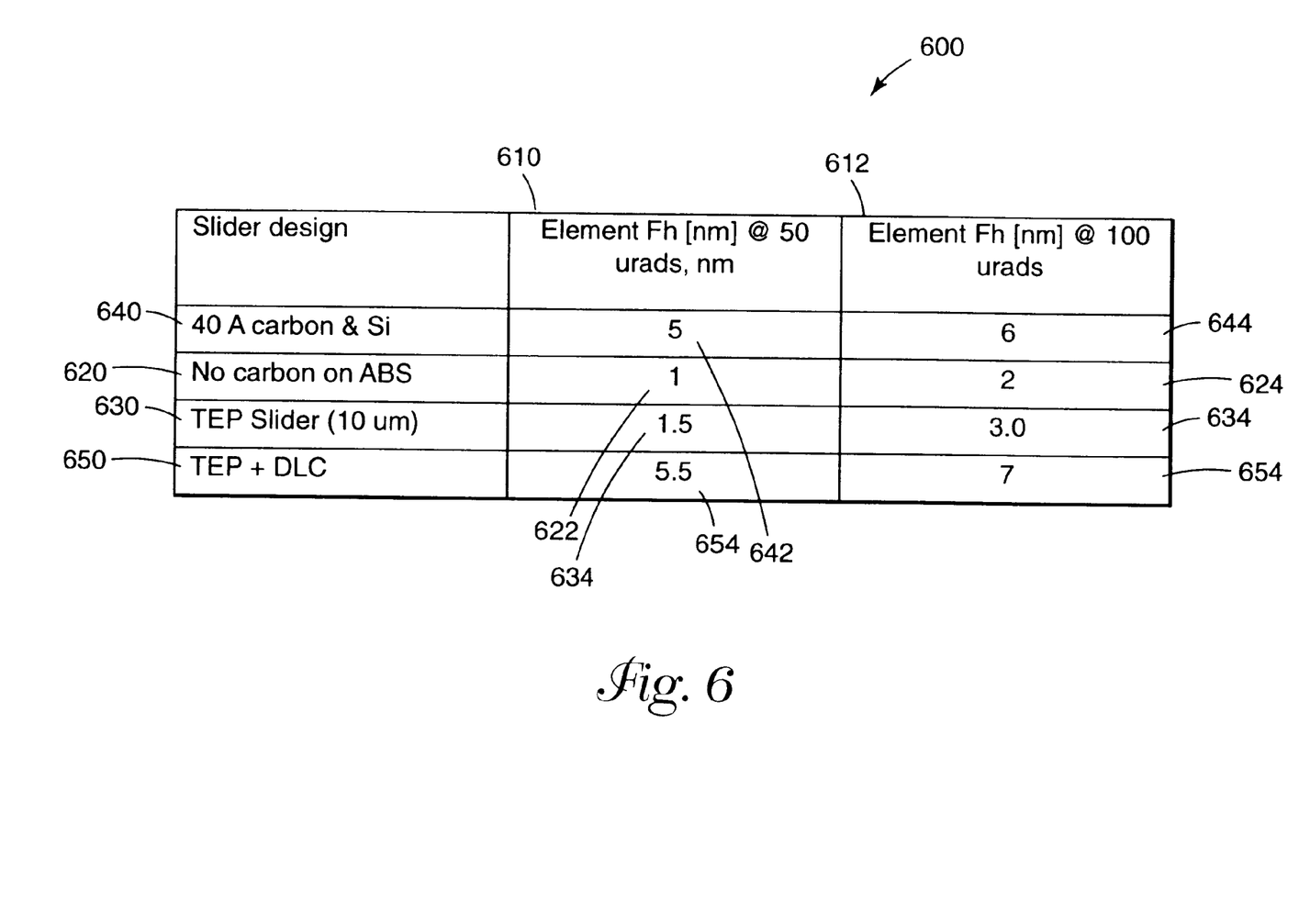
FIG. 6 illustrates a table that summarizes the flying height data for all four slider designs as discussed with reference to FIGS. 2–5.

FIG. 6 illustrates a table that summarizes the flying height data for all four slider designs 200, 300, 400, 500 as discussed above. In FIG. 6, the element fly height for each slider is shown for two different pitch angles, i.e., 50 urads 610 and 100 urads 612. The slider with a carbon overcoat and no TEP 620 exhibits the lowest element fly height, i.e., 1 nm at 50 urads 622 and 2 nm at 100 urads 624. However, as mentioned above, contact occurs between alumina layer and the carbon overcoat of the disk. The next lowest element fly-height is the TEP slider 630. The TEP slider 630 exhibits an element fly height of 1.5 nm at 50 urads 632 and 3.0 nm at 100 urads 634. Still, the TEP slider 630 provides a lower element fly-height than the conventional slider 640 (an element fly height of 5 nm at 50 urads 642 and 6.0 nm at 100 urads 644) and the slider with both the TEP and the DLC 650 (an element fly height of 5.5 nm at 50 urads 652 and 7.0 nm at 100 urads 654), yet maintains a carbon-to-carbon contact at the head-disk interface (HDI).

The following advantages of the Trailing Edge Pad (TEP) can be expected:

Carbon-to-carbon (or SiC-to-Carbon) contact means better tribological performance for regardless of some slider wear.

Tribological performance is independent of carbon thickness on ABS. Carbon coating on the ABS could be reduced to zero without affecting the tribological performance of the slider;

A TEP made of carbon (SiC, or other material) provides improved wear resistance and lower friction compared to unprotected alumina contacting the disk MR stripe is kept further away from the point of slider-disk contact. This means less wear and contamination for MR stripe without significant loss of spacing.

Partial or complete substitution of the alumina layer with carbon or other tribologically attractive material can further reduce the head-disk spacing.

Figure 7:
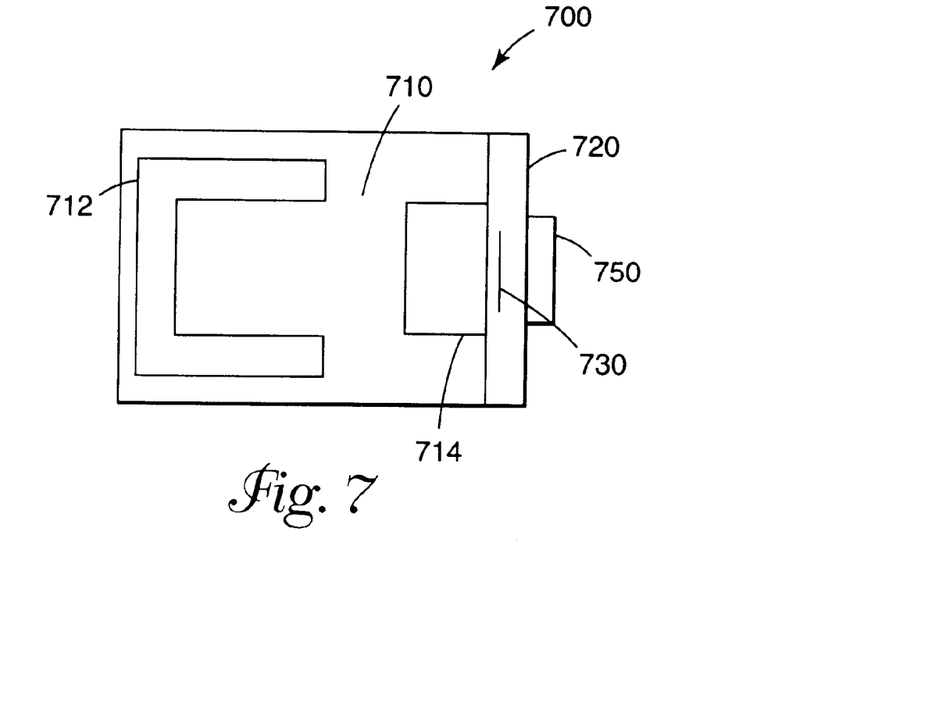
FIG. 7 illustrates a slider wherein partial substitution of the alumina layer with carbon or other tribologically attractive material further reduce the head-disk spacing

FIG. 7 illustrates a slider 700 wherein partial substitution of the alumina layer with carbon or other tribologically attractive material further reduce the head-disk spacing. In FIG. 7, the slider 700 includes an air bearing surface 710 with a leading edge pad 712 that forms a negative pressure pocket. A trailing edge pad 714 is positioned at the trailing edge. A layer of alumina 720 is deposited over the magnetic strip 730. The alumina layer is shown with a thickness less than that shown in FIGS. 2–5, i.e. in FIG. 7 the alumina layer may be only 20 μm. In FIG. 7, a TEP 750 is positioned in alignment with the magnetic stripe 730. The TEP 750 then may have a thickness of 10 μm, so that the total thickness of the alumina layer 720 and the TEP 750 is now the same as the thickness of the alumina layer as shown in FIGS. 2–5.

Figure 8:
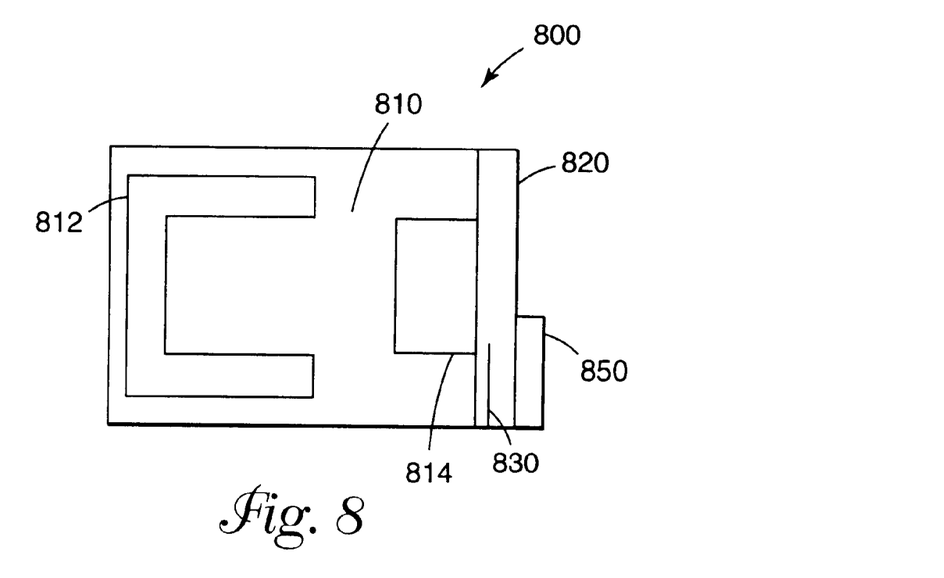
FIG. 8 illustrates another embodiment of a slider the alumina layer has been partially substituted with carbon or other tribologically attractive material further reduce the head-disk spacing.

FIG. 8 illustrates another embodiment of a slider 800 the alumina layer has been partially substituted with carbon or other tribologically attractive material further reduce the head-disk spacing. However, in FIG. 8, the magnetic stripe 830 is positioned near a side of the slider. Consequently, the TEP 850 is positioned in alignment with the magnetic stripe 830 near the side of the slider.

In order for the TEP to be effective, the slider should contact the disk predominantly with its trailing edge. To achieve this, it is desired that slider geometry, such as length, crown, and pitch angle, satisfy the following condition:

$$\alpha \geq 4 \text{ Crown/Length},$$

where α a is the pitch angle of the slider. For a slider with a crown of about 5 nm, and a length of 1 mm, α must be larger than 20 urads to ensure contact at the trailing edge. If the pitch angle is less than the critical value of 20 urads then the contact will occur away from the trailing edge and the TEP will be less effective. The pitch angles for sliders are typically 50 urads or more. Thus, the above condition is satisfied. To take full advantage of TEP it is desirable to combine it with higher pitch angle and smaller slider crown. This will provide contact between the disk and the TEP only.

Figure 9A:
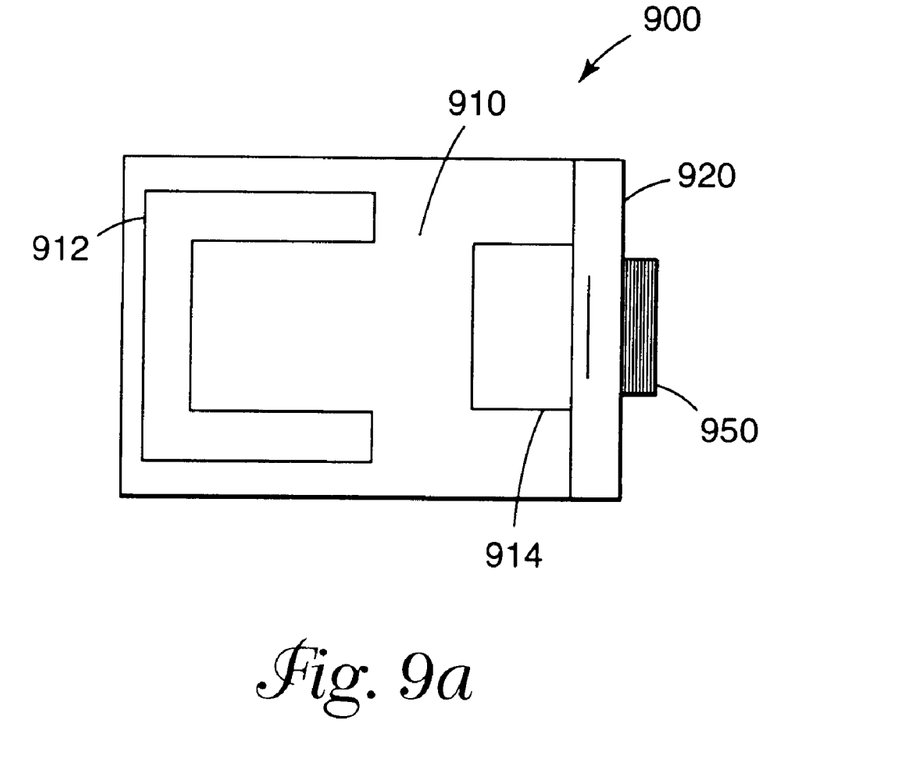
FIGS. 9a–b illustrate an alternative implementation of a TEP slider according to the present invention.
Figure 9B:
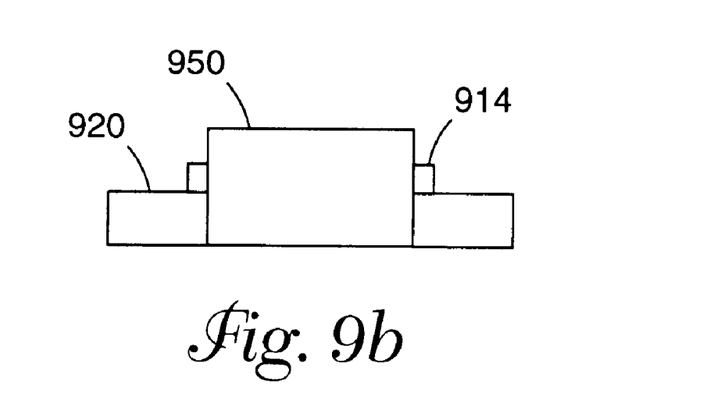
Figure 10A:
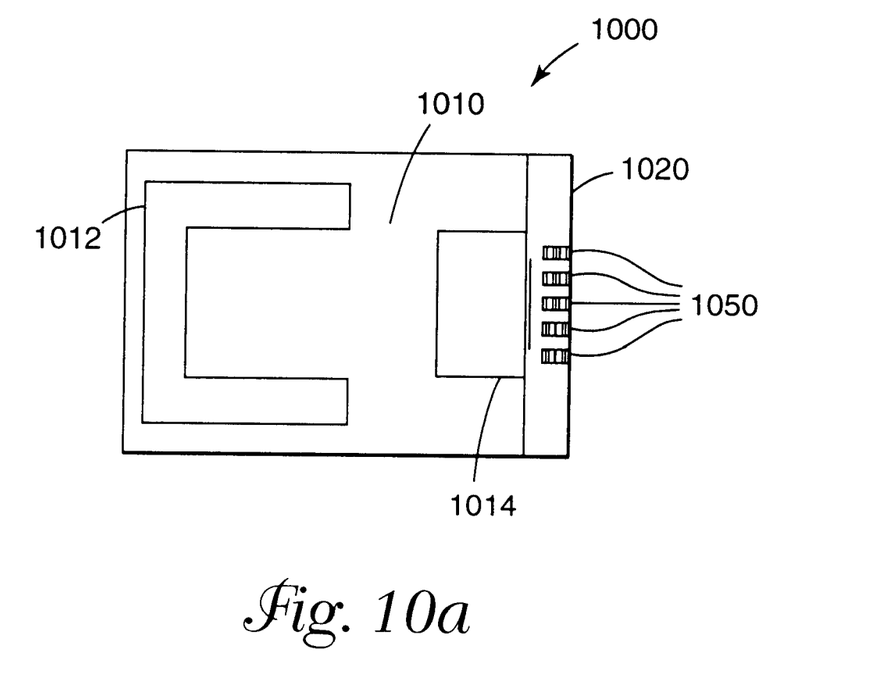
FIGS. 10a–b illustrate yet another implementation of a TEP slider according to the present invention wherein the TEP is broken-up into several sub-pads to reduce the stress in the structure that could lead to delamination.
Figure 10B:
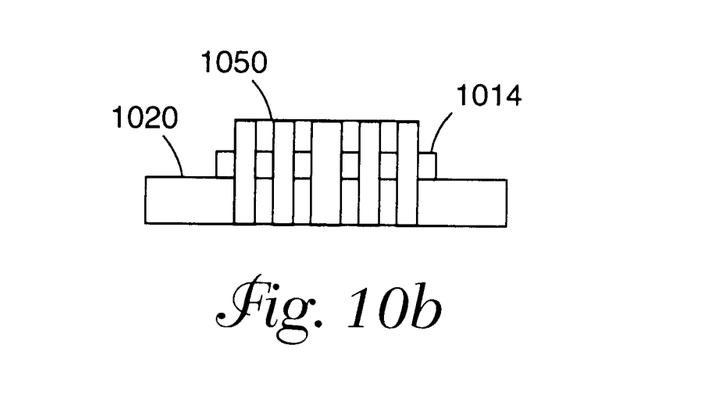

FIGS. 9a–b illustrate an alternative implementation of a TEP slider 900 according to the present invention. In FIG. 9a, the slider 900 includes an air bearing surface 910 with a leading edge pad 912 that forms a negative pressure pocket. A trailing edge pad 914 is positioned at the trailing edge. A layer of alumina 920 is deposited over the magnetic strip 930. However, in FIG. 9a, a much thinner DLC layer 950, e.g., 1 um to a few urn thickness, is sandwiched into the alumina layer 920 by appropriate masking techniques. The lapping and etching processes in the ABS plane will cause the harder TEP 950 to protrude somewhat as shown in FIG. 9b. This will lead to the desired effect of providing contact points/pads of carbon (or other suitable material) at the HDI. To reduce the stress in the structure that could lead to delamination, the TEP could be broken-up into several sub-pads, as indicated in the slider of FIGS. 10a–b.

Those skilled in the art will recognize that the TEP pad may be formed using several types of pad material. For example, the pad material may be:

PVD or CVD hard diamond-like carbon, including C:Hx and C:Nx. For low stress version of thick carbon films, microwave and plasma CVD carbon film may be the most likely film to be used.

SiC, as one of the hardest known materials with high thermal conductivity and good tribological properties;

Metal (Ta or W), implanted with hydrocarbons (or nitrogen) to form carbide or nitride film (,1 um thick) surface. This is expected to produce hard and corrosion resistant film with low stress.

Boron nitride, boron oxide and low fluorine-doped carbon films, which have high hardness and good tribological properties.

Multilayered carbon films can be used to reduce the film's internal stress.

Figure 11:
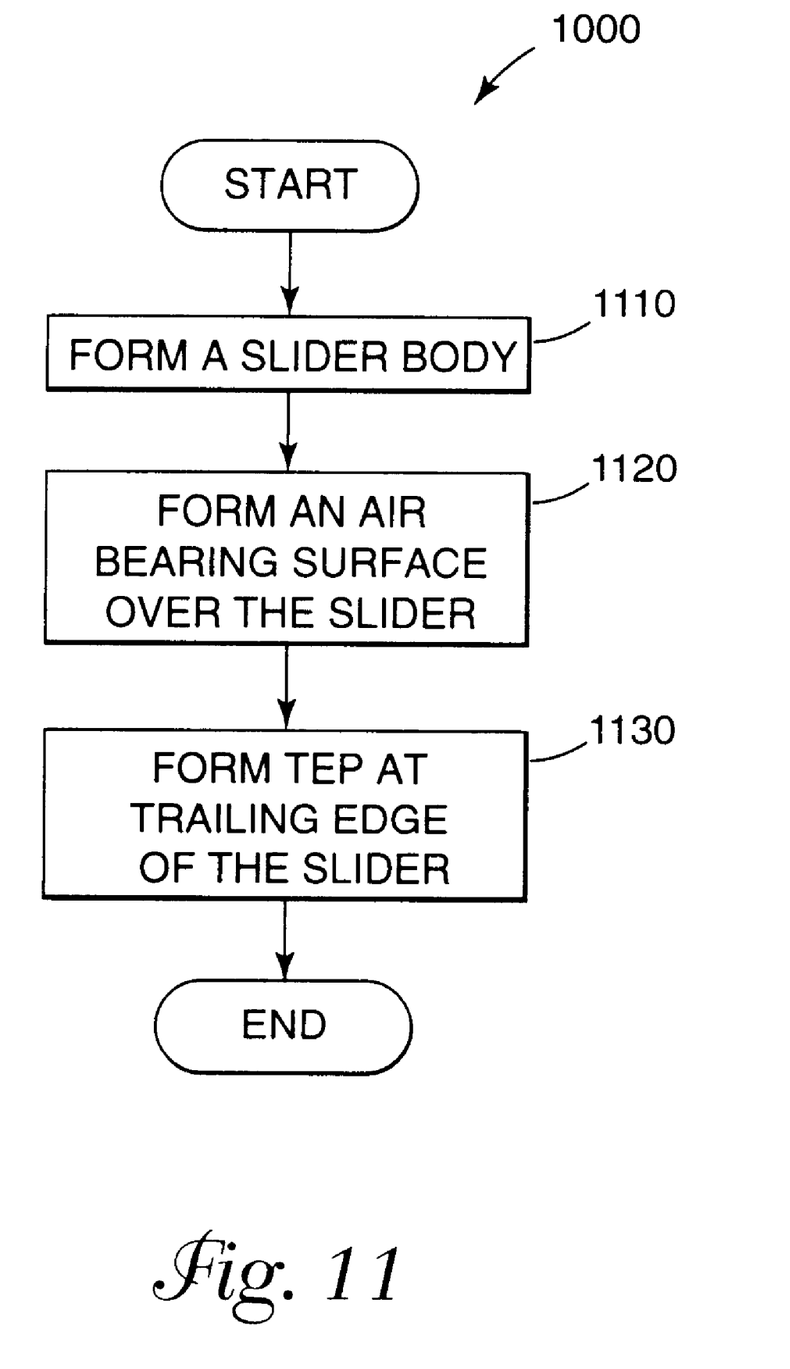
FIG. 11 is a flow chart illustrating the process for making a slider with a TEP according to the present invention.

FIG. 11 is a flow chart 1100 illustrating the process for making a slider with a TEP according to the present invention. In FIG. 11, a four sided slider body is formed 1110. Next, an air bearing surface is formed 1120. A trailing edge pad is then formed at the trailing edge of the slider 1130. As described above, a TEP thickness of sufficient thickness is selected to provide sufficient wear resistance at the trailing edge of the slider.

The forming of the air bearing surface 1120 may further include forming a protective overcoat with decreased thickness over the air bearing surfaces. The decrease in thickness of the protective overcoat may correspond to an increase in a magnetic spacing caused by the addition of the trailing edge pad to the slider. However, those skilled in the art will also recognized, in keeping with the teaching of the present invention, that the decrease in thickness of the protective overcoat may be greater than the corresponding increase in a magnetic spacing caused by the addition of the trailing edge pad to the slider. Moreover, the forming of the protective coat may be omitted. In this case, the trailing edge pad provides the only carbon-carbon interface between the slider and the disk.

In summary the present invention provides a storage system slider having a trailing edge pad and method for making the same. A trailing edge pad provides a carbon-carbon contact between the storage medium surface and slider and allows a reduction in the thickness of the DLC so that the magnetic spacing is reduced.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for forming a slider with sufficient carbon-carbon contact at a point where the slider interfaces with a disk, comprising:

forming a slider body having a first side, a second side, a leading edge and a trailing edge;

forming air bearing surface on the slider body, the air bearing surface further comprising a protective overcoat having a thickness over the air bearing surfaces; and forming a trailing edge pad at the trailing edge of the slider, wherein the trailing edge pad has a thickness that is greater than 10 $\mu$m to increase wear resistance of the trailing edge, and wherein the thickness of the protective overcoat offsets an increase in a magnetic spacing caused by the addition of the trailing edge pad to the slider.

2. The method of claim 1 wherein the trailing edge pad provides the only carbon-carbon interface between the slider and the disk.

3. The method of claim 1 wherein the trailing edge pad is formed only over a portion of the trailing edge, the trailing edge pad being positioned in alignment with a magnetic stripe of a magnetic head.

4. A slider having a carbon-carbon contact at a point where the slider interfaces with a disk, comprising a slider body having a first side, a second side, a leading edge and a trailing edge;

an air bearing surface formed on the slider body, the air bearing surface further comprising a protective overcoat having a thickness over the air bearing surfaces; and a trailing edge pad coupled to the slider at the trailing edge of the slider, wherein the trailing edge pad has a thickness that is greater than 10 $\mu$m to increase wear resistance of the trailing edge and wherein the thickness of the protective overcoat offsets an increase in a magnetic spacing caused by the addition of the trailing edge pad to the slider.

5. The slider of claim 4 wherein the trailing edge pad provides the only carbon-carbon interface between the slider and the disk.

6. The slider of claim 4 wherein the trailing edge pad is formed only over a portion of the trailing edge, the trailing edge pad being positioned in alignment with a magnetic stripe of a magnetic head.

7. A system for storing and retrieving information, comprising:

a magnetic disk;

a motor, coupled to the disk, for rotating the disk;

a recording surface, disposed on the magnetic disk, the recording surface dragging air as the disk rotates and creating an air flow in parallel with a tangential velocity of the disk rotation; and a slider having a carbon-carbon contact at a point where the slider interfaces with a disk, the slider further comprising a slider body having a first side, a second side, a leading edge and a trailing edge;

an air bearing surface formed on the slider body, the air bearing surface further comprising a protective overcoat having a thickness over the air bearing surfaces; and a trailing edge pad coupled to the slider at the trailing edge of the slider, wherein the trailing edge pad has a thickness that is greater than 10 µm to increase wear resistance of the trailing edge and wherein the thickness of the protective overcoat offsets an increase in a magnetic spacing caused by the addition of the trailing edge pad to the slider.

8. The system of claim 7 wherein the trailing edge pad provides the only carbon-carbon interface between the slider and the disk.

9. The system of claim 7 wherein the trailing edge pad is formed only over a portion of the trailing edge, the trailing edge pad being positioned in alignment with a magnetic stripe of a magnetic head.

10. A disk drive apparatus for recording data, comprising:

at least one rotating disk for recording data;

a housing, the rotatable disk being rotatably attached to the housing;

an actuator arm assembly, coupled to the housing;

a slider, attached to the actuator arm assembly proximate to the recording surface such that the slider can be selectively positioned over the surface of the rotating disk, the slider having a carbon-carbon contact at a point where the slider interfaces with a disk, the slider further comprising a slider body having a first side, a second side, a leading edge and a trailing edge;

an air bearing surface formed on the slider body, the air bearing surface further comprising a protective overcoat having a thickness over the air bearing surfaces; and a trailing edge pad coupled to the slider at the trailing edge of the slider, wherein the trailing edge pad has a thickness that is greater than 10 µm to increase wear resistance of the trailing edge and wherein the thickness of the protective overcoat offsets an increase in a magnetic spacing caused by the addition of the trailing edge pad to the slider.

11. The disk drive apparatus of claim 10 wherein the trailing edge pad provides the only carbon-carbon interface between the slider and the disk.

12. The disk drive apparatus of claim 10 wherein the trailing edge pad is formed only over a portion of the trailing edge, the trailing edge pad being positioned in alignment with a magnetic stripe of a magnetic head.

13. A slider having a carbon-carbon contact at a point where the slider interfaces with a disk, comprising a slider body having a first side, a second side, a leading edge and a trailing edge;

an air bearing surface formed on the slider body;

an alumina layer encapsulating a magnetic head;

a protective overcoat formed over air bearing surface; and at least one trailing edge pad coupled to the slider at the trailing edge of the slider, wherein a thickness of the trailing edge pad is selected to increase wear resistance of the trailing edge, wherein a thickness of the protective overcoat offsets an increase in a magnetic spacing caused by the addition of the trailing edge pad to the slider.

14. The slider of claim 13 wherein the at least one trailing edge pad comprises a plurality of layers sandwiched into the alumina layer.

15. The slider of claim 14 wherein the at least one trailing edge pad comprises a plurality of pads disposed along the trailing edge sandwiched into the alumina layer and aligned with the magnetic head.

16. The slider of claim 15 wherein the at least one trailing edge pad protrudes from the alumina layer.

* * * * *